(12) United States Patent
Guha et al.

(10) Patent No.: US 12,481,043 B2
(45) Date of Patent: Nov. 25, 2025

(54) SYSTEMS AND TECHNIQUES FOR DEICING SENSORS

(71) Applicant: GM Cruise Holdings LLC, San Francisco, CA (US)

(72) Inventors: Anurup Guha, Sunnyvale, CA (US); Amanda Lind, Brooklyn, NY (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 419 days.

(21) Appl. No.: 18/156,995

(22) Filed: Jan. 19, 2023

(65) Prior Publication Data
US 2024/0248188 A1    Jul. 25, 2024

(51) Int. Cl.
  *G01S 7/52* (2006.01)
  *G01S 15/931* (2020.01)
  *G10K 9/122* (2006.01)

(52) U.S. Cl.
  CPC . *G01S 7/52004* (2013.01); *G01S 2007/52011* (2013.01); *G01S 15/931* (2013.01); *G10K 9/122* (2013.01)

(58) Field of Classification Search
  CPC ............... G01H 15/00; G01S 15/931; G01S 2007/52011; G01S 7/52004; G10K 9/122
  USPC ......................................................... 702/54
  See application file for complete search history.

(56) References Cited

U.S. PATENT DOCUMENTS

2016/0023772 A1* 1/2016 Borigo ................ B64D 15/163
                                                                       15/94
2016/0229460 A1* 8/2016 Kowalk ................... B60S 1/66

FOREIGN PATENT DOCUMENTS

EP                2618177 A1 * 7/2013 ............. G01S 15/36

* cited by examiner

*Primary Examiner* — Lisa M Caputo
*Assistant Examiner* — Joshua L Forristall
(74) *Attorney, Agent, or Firm* — CANTOR COLBURN LLP

(57) ABSTRACT

Systems and techniques are provided for deicing/defrosting an ultrasonic sensor using frequency tuning. An example method can include determining that a radiation surface of a housing of an acoustic sensor includes a layer of frozen precipitation, wherein the housing contains a transducer configured to emit sound waves through the radiation surface and receive sound waves that are reflected from a target and pass through the radiation surface to the transducer; determining resonance frequency for sound waves that yields a shear stress on an interface between the radiation surface and the layer of frozen precipitation on the radiation surface, wherein the shear stress exceeds an adhesive shear strength of the layer of frozen precipitation; generating the sound waves having the resonance frequency; and removing the layer of frozen precipitation on the radiation surface based on the sound waves having the resonance frequency.

20 Claims, 9 Drawing Sheets

SYSTEMS AND TECHNIQUES FOR DEICING SENSORS

TECHNICAL FIELD

The present disclosure generally relates to systems and techniques for deicing/defrosting sensors. For example, aspects of the disclosure relate to systems and techniques for deicing/defrosting an ultrasonic sensor using frequency tuning to overcome the adhesive shear strength of a layer(s) of frozen precipitation on a surface of the ultrasonic sensor.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

Illustrative examples and aspects of the present application are described in detail below with reference to the following figures.

DETAILED DESCRIPTION

Figure 1:
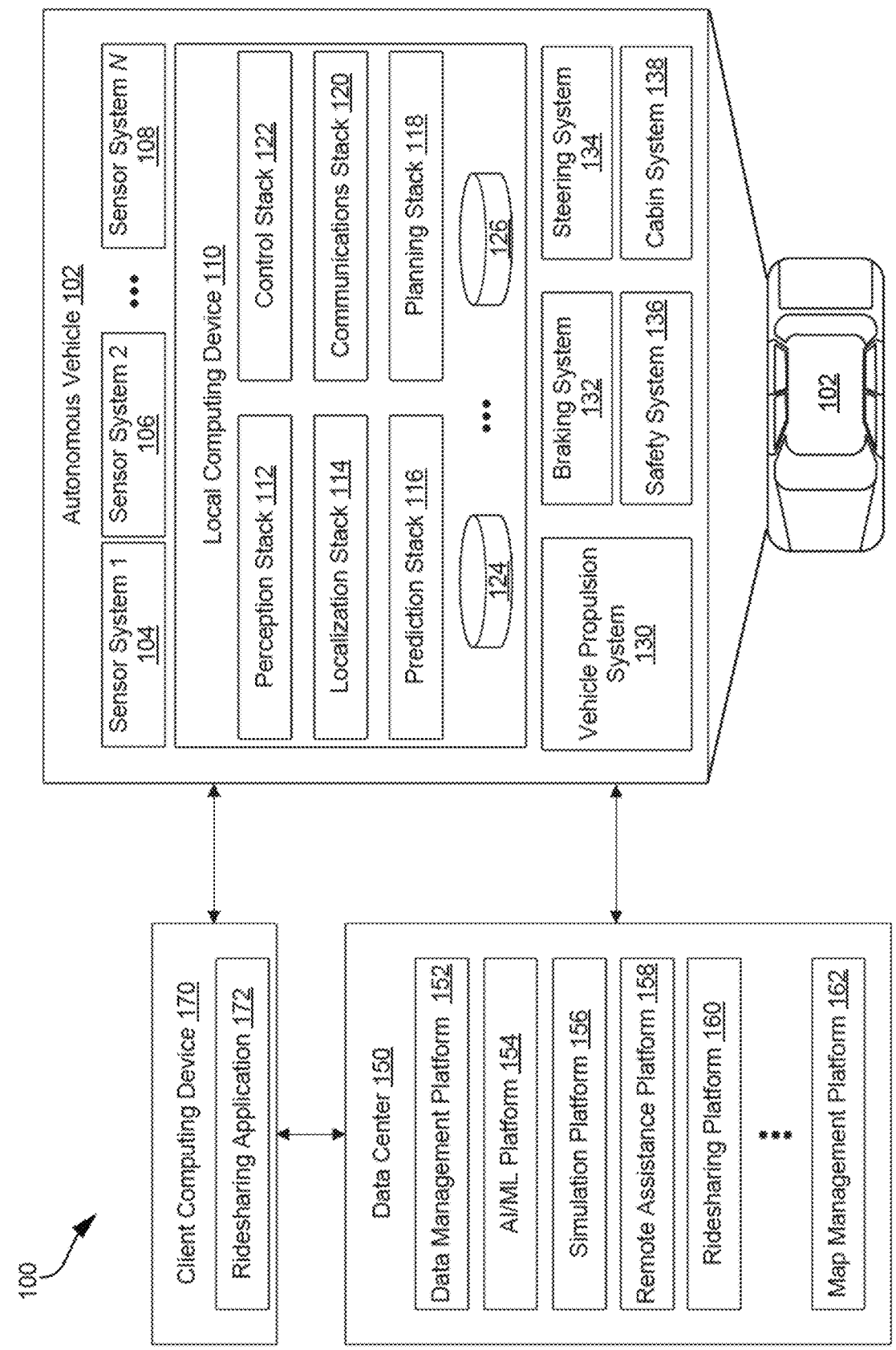
FIG. 1 illustrates an example system environment that can be used to facilitate autonomous navigation and routing operations, according to some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides aspects and examples of the disclosure, and is not intended to limit the scope, applicability, or configuration of the disclosure. Rather, the ensuing description of the aspects and examples of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, an inertial measurement unit (IMU), and/or an acoustic sensor (e.g., sound navigation and ranging (SONAR), microphone, etc.), global navigation satellite system (GNSS) and/or global positioning system (GPS) receiver, amongst others. The AVs can use the various sensors to collect data and measurements that the AVs can use for AV operations such as perception (e.g., object detection, event detection, tracking, localization, sensor fusion, point cloud processing, image processing, etc.), planning (e.g., route planning, trajectory planning, situation analysis, behavioral and/or action planning, mission planning, etc.), control (e.g., steering, braking, throttling, lateral control, longitudinal control, model predictive control (MPC), proportional-derivative-integral, etc.), prediction (e.g., motion prediction, behavior prediction, etc.), etc. The sensors can provide the data and measurements to an internal computing system of the autonomous vehicle, which can use the data and measurements to control a mechanical system of the autonomous vehicle, such as a vehicle propulsion system, a braking system, and/or a steering system, for example.

Some AVs may be able and/or designed to operate in environments that have or experience a variety of climatic conditions. For example, an AV may operate in environments that, at times, may have or experience sub-zero degree temperatures. The sub-zero degree temperatures in such environments can cause frozen precipitation (e.g., ice, frost, snow, hail, etc.) to form on and/or adhere to the surface sensors used by the AV to navigate and operate in such environments. However, the frozen precipitation on the surface of sensors used by the AV can negatively impact a performance and/or operation of the sensors which, in turn, can negatively impact the performance of the AV when navigating in environments with sub-zero degree temperatures. To illustrate, the frozen precipitation on the surface of the sensors can impede the ability of the sensors to obtain sensor data (e.g., measurements, etc.) in such environments, degrade a performance of the sensors in such environments, and/or decrease the accuracy of the sensor data collected by the sensors.

Generally, if a surface of an AV sensor becomes partially or fully covered in frozen precipitation, a human may be able to manually remove the frozen precipitation from the surface of the AV sensor in order to allow the AV sensor to operate in the environment and/or to prevent/minimize a degradation of a performance of the AV sensor. However, relying on a human to manually remove frozen precipitation from the surface of every AV sensor that becomes partially or fully covered in frozen precipitation can be impractical, inconvenient, and/or inefficient. There is also a risk that, in attempting to manually remove frozen precipitation from the surface of an AV sensor, a human may unintentionally/accidentally damage the AV sensor, further impairing the operation of the AV sensor and the AV that implements that AV sensor. In many cases, a human may be unable to adequately deice or defrost an AV sensor without damaging the AV sensor, or may not have the proper tools to adequately deice or defrost the AV sensor. Even if a human has the proper tools and can adequately remove frozen precipitation from the surface of an AV sensor without damaging the AV sensor, the human cannot deice/defrost the AV sensor in real-time and/or while the AV operates, and it is impractical to rely on a human to continuously deice/defrost AV sensors as the AV sensors accumulate frozen precipitation. In addition, if an AV relies on a human to manually deice or defrost sensors on an AV, such AV may not be able to operate in environments with sub-zero degree temperatures without a human present in the AV given the risk that frozen precipitation may accumulate on and/or adhere to a surface of the sensors on the AV.

Systems, apparatuses, processes (also referred to as methods), and computer-readable media (collectively referred to as "systems and techniques") are described herein for deicing and defrosting sensors. In some examples, the systems and techniques described herein can be used to deice and/or defrost an ultrasonic sensor implemented by an AV, such as an ultrasonic near-field sensor, using frequency tuning. For example, the systems and techniques described herein can use frequency tuning to generate excitations (e.g., via resonant frequencies) upon the interface between the sensor and the frozen precipitation and overcome the adhesive shear strength of a frozen precipitation layer(s) on a surface of a sensor, such as an ultrasonic sensor. Thus, using frequency tuning and resonance frequencies, the systems and techniques described herein can remove and/or break a layer(s) of frozen precipitation that may accumulate on a surface of a sensor, such as an ultrasonic sensor.

Generally, an automotive ultrasonic sensor has an active piezoelectric element that the ultrasonic sensor uses to emit sound. The piezoelectric element can be contained inside a housing of the ultrasonic sensor. In some examples, the housing can include a can or container, such as an aluminum can or container. The piezoelectric element can be used to remove or break a layer(s) of frozen precipitation from a surface of the housing of the ultrasonic sensor. For example, because of the coupling between the piezoelectric element of the ultrasonic sensor and the housing (e.g., the aluminum can/container) of the ultrasonic sensor that contains the piezoelectric element, the outer surface of the housing can have an out-of-plane displacement when the ultrasonic sensor is provided with an excitation signal (e.g., an excitation signal with finite amplitude) from the piezoelectric sensor.

Moreover, the electromechanical impedance of the ultrasonic sensor can change in the presence of frozen precipitation on the ultrasonic sensor. This can result in a shift in the resonance frequency of the ultrasonic sensor. When an ultrasonic sensor with a layer(s) of frozen precipitation is driven at the shifted resonance frequencies, the shear stress at the interface between the frozen precipitation and the housing of the ultrasonic sensor can exceed the adhesive shear strength associated with the frozen precipitation. Thus, the systems and techniques described herein can deice/defrost ultrasonic sensors using certain frequencies (e.g., the shifted resonance frequencies) of ultrasonic sensors with a layer(s) of frozen precipitation, which can cause the shear stress to exceed the adhesive shear strength of the interface between the housing of the ultrasonic sensor and the layer(s) of frozen precipitation. Driving the ultrasonic sensor at such frequencies with a high duty cycle can also produce a certain amount of heat. Such heat produced by driving the ultrasonic sensor at such frequencies with a high duty cycle can further aid deice/defrost the ultrasonic sensor.

Examples of the systems and techniques described herein are illustrated in FIG. 1 through FIG. 8 and described below.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include one or more inertial measurement units (IMUs), camera sensors (e.g., still image camera sensors, video camera sensors, etc.), light sensors (e.g., LIDARs, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, time-of-flight (TOF) sensors, seat occupancy sensors, open/closed door sensors, tire pressure sensors, rain sensors, and so forth. For example, the sensor system 104 can include a camera system, the sensor system 106 can include a LIDAR system, and the sensor system 108 can include a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can include multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can, in some instances, include one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 8.

Figure 2:
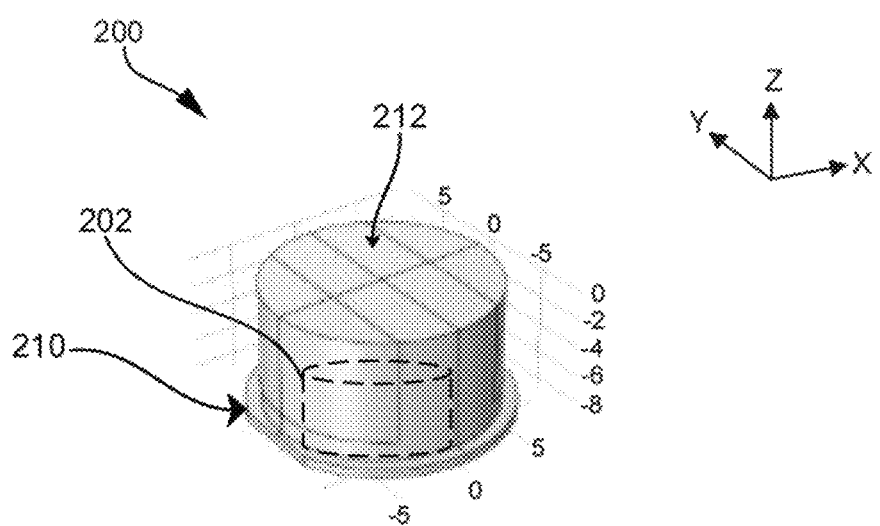
FIG. 2 is a diagram illustrating an example ultrasonic sensor that can be implemented by one or more systems such as an autonomous vehicle, according to some examples of the present disclosure.

FIG. 2 is a diagram illustrating an example ultrasonic sensor 200 that can be implemented by one or more systems such as, for example, an AV. The ultrasonic sensor 200 can measure a distance to an object using ultrasonic sound waves. In some cases, the ultrasonic sensor 200 can additionally or alternatively perform other tasks such as, for example and without limitation, object detection, position detection, and/or irregularities (e.g., cracks, air bubbles, flaws, etc.) in a material. Generally, an ultrasonic sensor can be used as a transceiver to send and receive ultrasonic sound waves or pulses that relay back information about an object such as, for example, the object's proximity.

For example, an ultrasonic sensor can transmit a sound wave at a certain frequency and receive an echo or return signal caused by the sound wave being reflected from a target such as an object. The ultrasonic sensor can determine the distance to the target by measuring a time lapse between the transmitted sound wave and the received ultrasonic waveform (e.g., ultrasonic echo/pulse).

As shown in the example of FIG. 2, the ultrasonic sensor 200 can include a transducer 202 configured to send and receive sound waves, such as a piezoelectric transducer. In some examples, the transducer 202 can include a transmitter for sending sound waves and a receiver for receiving sound waves. The transmitter and receiver can be implemented as separated units or embedded within a single unit (e.g., integrated in a same unit). In FIG. 2, the transducer 202 includes a piezoelectric transmitter (e.g., also referred to as a piezoelectric actuator) and a receiver integrated into a same package or unit. For example, the transmitter component of the transducer 202 can include a piezoelectric element configured to emit sound.

In addition, the ultrasonic sensor 200 can include a housing 210 that contains/houses the components of the ultrasonic sensor 200, such as the transducer 202. The material(s) of the housing 210 can vary in different implementations. For example, in some cases, the housing 210 can include an aluminum can or case. In other examples, the housing 210 can include a can or case of another type of metal or material.

The housing 210 can include a sensor surface 212, such as an ultrasonic radiation surface. Ultrasonic sound signals transmitted by the transducer 202 travel from the transducer 202, through the sensor surface 212, and towards a target. Ultrasonic sound signals received by the transducer 202 travel from a target, through the sensor surface 212, and back to the transducer 202.

In some cases, when operating the ultrasonic sensor 200 in sub-zero degree temperatures, the sensor surface 212 can accumulate frozen precipitation (e.g., ice, frost, snow, hail, etc.) that may become adhered to the sensor surface 212. The frozen precipitation on the sensor surface 212 can negatively impact the ability of the transducer 202 to send and receive signals to and from a target. For example, in some cases, the frozen precipitation on the sensor surface 212 can at least partially block sound signals transmitted by the transducer 202 and/or reflected from a target to the ultrasonic sensor 200, and/or can degrade the quality of the sound signals transmitted from the transducer 202 and/or reflected from a target towards the ultrasonic sensor 200.

Figure 3A:
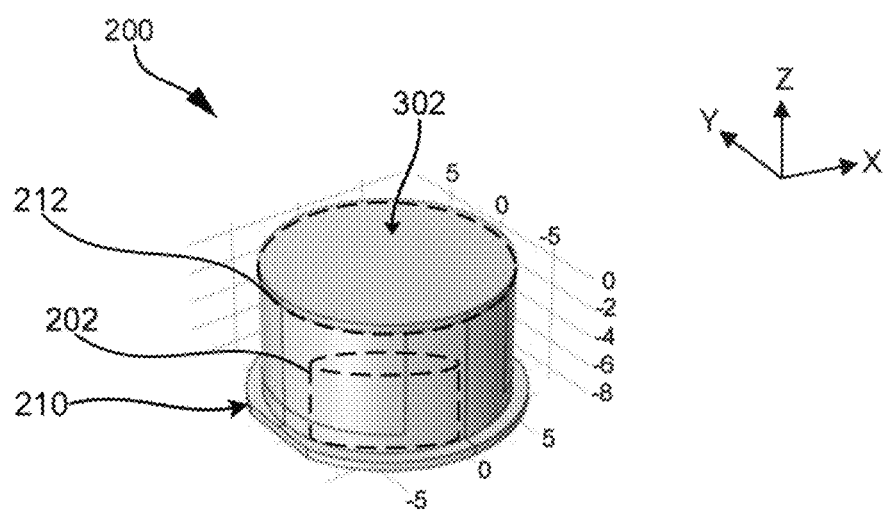
FIG. 3A is a diagram illustrating an example of an ultrasonic sensor with a layer(s) of frozen precipitation deposited on a sensor surface, according to some examples of the present disclosure.

FIG. 3A is a diagram illustrating an example of the ultrasonic sensor 200 with a layer(s) 302 of frozen precipitation deposited on the sensor surface 212. As shown, the layer(s) 302 of frozen precipitation can sit on the external side of the sensor surface 212 (e.g., on the side of the sensor surface 212 opposite to the side of the sensor surface 212 facing the transducer 202 and the interior of the housing 210). Moreover, the layer(s) 302 of frozen precipitation can become adhered to the sensor surface 212 and difficult to remove from the sensor surface 212.

The layer(s) 302 of frozen precipitation on the sensor surface 212 can fully or partially block signals to/from the transducer 202 from traveling through the sensor surface 212 (and to or from the transducer 202), and/or may degrade the quality of the signals traveling through the sensor surface 212 (e.g., to or from the transducer 202). Accordingly, the layer(s) 302 of frozen precipitation on the sensor surface 212 is undesirable as it can impact the performance of the ultrasonic sensor 200 and/or the quality of the data produced/collected by the ultrasonic sensor 200. As further described herein, the systems and techniques of the disclosure can be implemented to automatically break and/or remove the layer(s) 302 of frozen precipitation from the sensor surface 212, thus eliminating the need for a human to manually break and/or remove the layer(s) 302 of frozen precipitation from the sensor surface 212.

In some examples, to break and remove the layer(s) 302 of frozen precipitation from the sensor surface 212, the transducer 202 can be configured to emit ultrasonic waves at a resonance frequency of the ultrasonic sensor 200 (and/or the housing 210). When the transducer 202 is driven at the resonance frequency, the shear stress created by the associated ultrasonic waves (e.g., the ultrasonic waves emitted at the resonance frequency) at the interface (e.g., the sensor surface 212) between the layer(s) 302 of ice and/or snow and the housing 210 can exceed the adhesive shear strength of the layer(s) 302 of ice and/or snow. As a result, the ultrasonic waves emitted by the transducer 202 at the resonance frequency can remove the layer(s) of ice and/or snow from the sensor surface 212. For example, the ultrasonic waves emitted by the transducer 202 at the resonance frequency can create a shear force that causes the layer(s) 302 of frozen precipitation to be displaced from the sensor surface 212 and break in shear.

In some cases, the layer(s) 302 of frozen precipitation on the sensor surface 212 can change the electromechanical impedance of the overall ultrasonic sensor 200. The change in the electromechanical impedance can then cause the resonance frequency to shift. Thus, in some examples, to remove the layer(s) 302 of frozen precipitation from the sensor surface 212 as previously explained, the transducer 202 can be configured to emit ultrasonic waves at the shifted resonance frequency/frequencies.

In some examples, the ultrasonic waves emitted by the transducer 202 at the resonance frequency can create excitation at the interface between the housing 210 (e.g., and/or the sensor surface 212 of the housing 210) and the layer(s) 302 of frozen precipitation. The excitation can break, displace, and/or remove the layer(s) 302 of frozen precipitation from the sensor surface 212, as previously explained. Moreover, driving the ultrasonic sensor 200 at selected frequencies (e.g., the resonance frequency/frequencies) with a duty cycle above a threshold (e.g., a high duty cycle) can create a certain amount of heat to be generated at and/or transmitted to the sensor surface 212, which can further help in deicing and/or defrosting the sensor surface 212. For example, by configuring the transducer 202 to emit ultrasonic sound waves at the resonance frequency/frequencies for a threshold period of time, the transducer 202 can generate heat that can reach the sensor surface 212 and aid in removing the layer(s) 302 of frozen precipitation from the sensor surface 212.

Figure 3B:
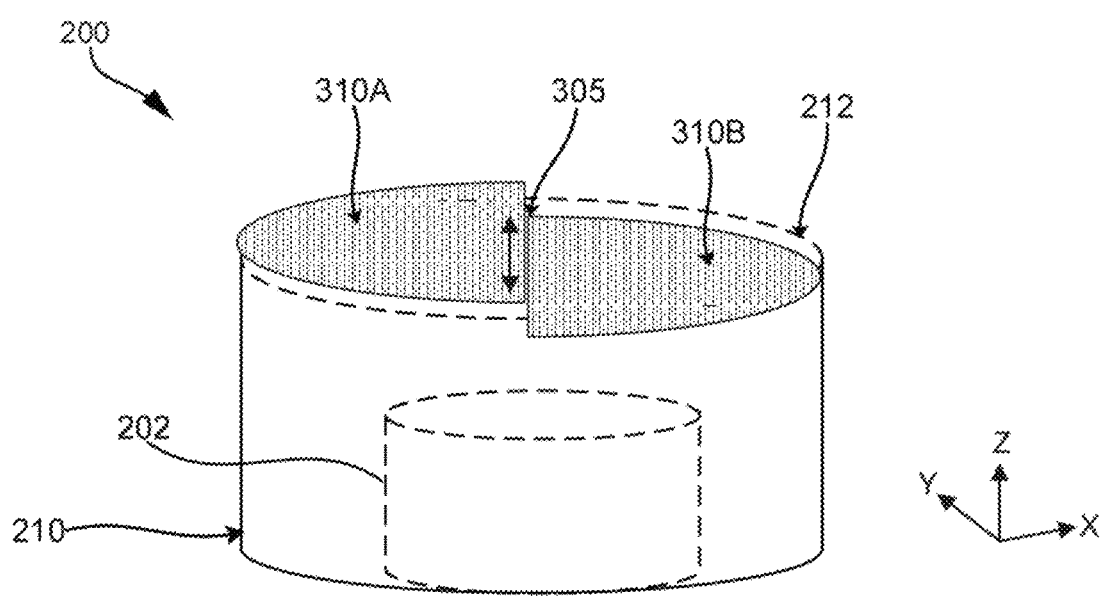
FIG. 3B is a diagram illustrating an example of an ultrasonic sensor with a displacement of frozen precipitation deposited on a sensor surface of the ultrasonic sensor, according to some examples of the present disclosure.

FIG. 3B is a diagram illustrating an example of an ultrasonic sensor 200 with a displacement of frozen precipitation deposited on a sensor surface 212 of the ultrasonic sensor 200, according to some examples of the present disclosure. The ultrasonic sensor 200 can have a layer(s) (e.g., layer(s) 302) of frozen precipitation, as illustrated in FIG. 3B. To break and remove the layer(s) of frozen precipitation from the surface 212 of the ultrasonic sensor 200, the transducer 202 can emit ultrasonic waves at a resonance frequency. The ultrasonic waves at the resonance frequency can create a shear 305 that breaks the layer(s) of frozen precipitation into frozen precipitation portions 310A-310B.

Moreover, the shear 305 can cause an out-of-plane displacement of the frozen precipitation portion 310A and/or the frozen precipitation portion 310B that allows the layer(s) of frozen precipitation (e.g., layer(s) 302) to be removed from the sensor surface 212 of the ultrasonic sensor 200. For example, the ultrasonic waves emitted by the transducer 202 at the resonance frequency can cause the shear 305 in the frozen precipitation and can cause an out-of-plane displacement of the frozen precipitation portions 310A and/or 310B. The shear 305 and the out-of-plane displacement of the frozen precipitation portions 310A and/or 310B can cause the layer(s) of frozen precipitation on the sensor surface 212 to fall off from and/or break away from the sensor surface 212. Therefore, the ultrasonic waves with the resonance frequency emitted by the transducer 202 can be used to remove frozen precipitation (e.g., the layer(s) 302 of frozen precipitation, the frozen precipitation portions 310A-310B) from the sensor surface 212 without requiring a human to manually break and remove the frozen precipitation from the sensor surface 212.

In some examples, the ultrasonic waves with the resonance frequency can apply a shear force on an area of the sensor surface 212 that causes the shear 305 and the out-of-plane displacement, as previously explained. The shear 305 and out-of-plane displacement of the frozen precipitation portions 310A-310B are merely illustrative examples provided for explanation purposes. In other examples, the ultrasonic waves with the resonance frequency can cause more shears than shown in FIG. 3B, one or more shears with a different configuration (e.g., a different location of the shear, a different pattern of the shear, etc.) than the shear 305 in FIG. 3B, can cause the layer(s) of frozen precipitation on the sensor surface 212 to break into more than two frozen precipitation portions, and/or can cause one or more different displacements of frozen precipitation and/or frozen precipitation portions than the out-of-plane displacement shown in FIG. 3B.

Figure 4:
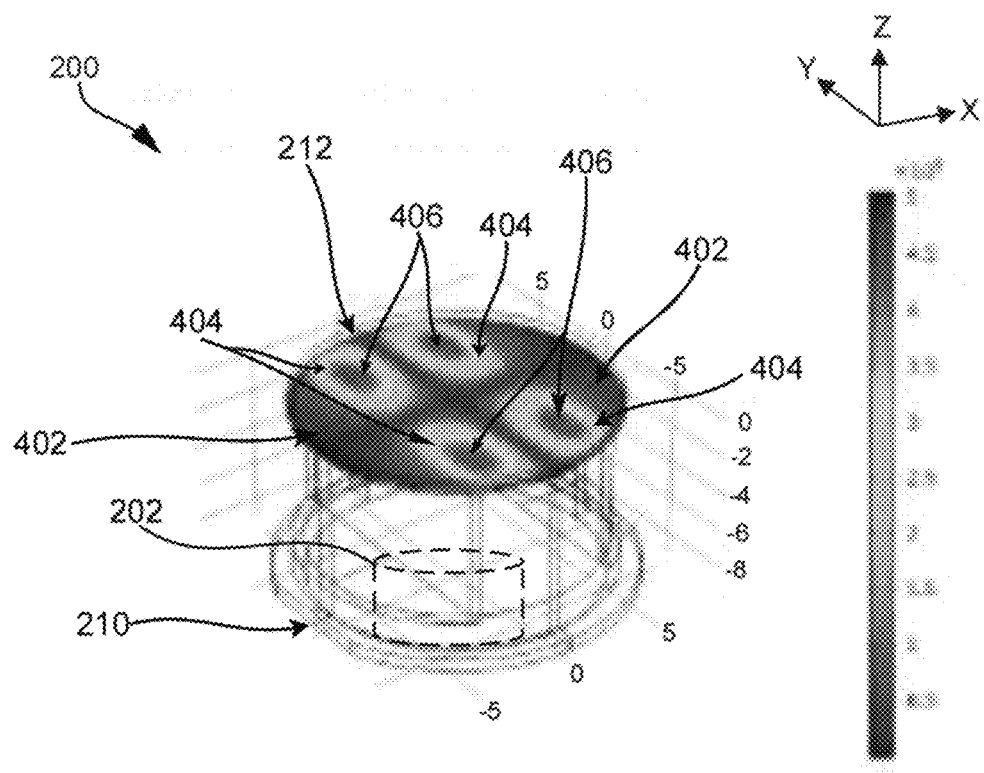
FIG. 4 is a diagram illustrating an example of a magnitude map for a shear stress created by ultrasonic waves emitted at a resonance frequency (or frequencies) on an interface between a housing of an ultrasonic sensor and a layer(s) of frozen precipitation on the housing, according to some examples of the present disclosure.

FIG. 4 is a diagram illustrating an example of a magnitude map for the shear stress created by ultrasonic waves emitted at the resonance frequency (or frequencies) on the interface between the housing 210 and a layer(s) of frozen precipitation (e.g., layer(s) 302) on the housing 210. For example, the magnitude map illustrates the magnitudes of shear stress at the sensor surface 212 created by ultrasonic waves emitted at the resonance frequency (or frequencies) associated with the ultrasonic sensor 200 (and/or the housing 210).

The magnitude map depicts a first intensity 402 of shear stress on the interface between the sensor surface 212 and the layer(s) of frozen precipitation on the sensor surface 212, a second intensity 404 of shear stress on the interface between the sensor surface 212 and the layer(s) of frozen precipitation on the sensor surface 212, and a third intensity 406 of shear stress on the interface between the sensor surface 212 and the layer(s) of frozen precipitation on the sensor surface 212. The first intensity 402, the second intensity 404, and the third intensity 406 of shear stresses can be produced by the shear forces applied on the interface (e.g., the interface between the sensor surface 212 and the layer(s) of frozen precipitation on the sensor surface 212) by the ultrasonic waves emitted (e.g., via the transducer 202) at the associated resonance frequency/frequencies.

In this example, the third intensity 406 represents a higher intensity than the second intensity 404 and the second intensity 404 represents a higher intensity than the first intensity 402. As shown, different regions of the interface between the sensor surface 212 and the layer(s) of frozen precipitation can have different intensities of shear stress. For example, based on the excitation frequency, regions of the interface can experience the first intensity 402 of shear stress, some regions of the interface can experience the second intensity 404 of shear stress, and other regions of the interface can experience the third intensity 406 of shear stress. The number, distribution, magnitudes, and/or placement/arrangement of shear stress intensities shown in FIG. 4 are merely examples provided for explanation purposes. One of ordinary skill in the art will recognize that other examples can include a different number, distribution, magnitude, and/or placement/arrangement of shear stress intensities than shown in FIG. 4.

In some examples, a formula for the average shear stress on the interface between the sensor surface 212 and the layer(s) of frozen precipitation can be based on the force per unit area as follows: $\tau = F/A$, where $\tau$ represents the shear stress, F represents the force applied, and A represents the cross-sectional area of material with area parallel to the applied force vector.

Figure 5:
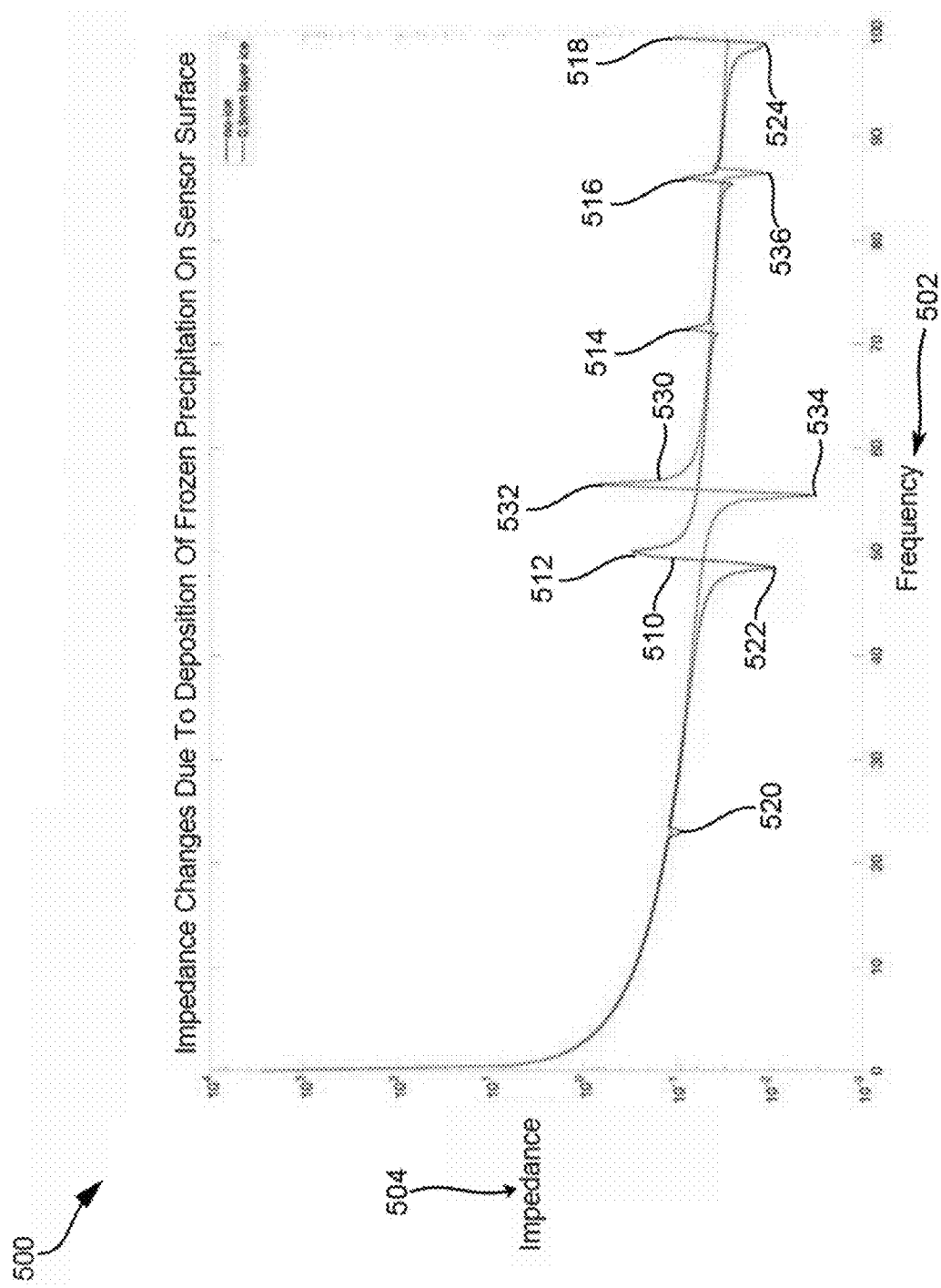
FIG. 5 illustrates an example chart showing impedance changes due to frozen precipitation deposition on a sensor surface, according to some examples of the present disclosure.

FIG. 5 illustrates an example chart 500 showing impedance changes due to frozen precipitation deposition on a sensor surface (e.g., sensor surface 212). As previously explained, the electromechanical impedance of the overall ultrasonic sensor (e.g., ultrasonic sensor 200) can change due to frozen precipitation (e.g., layer(s) 302 of frozen precipitation) deposited on the sensor surface (e.g., sensor surface 212). The chart 500 provides an illustrative example of impedance changes caused by frozen precipitation on the sensor surface (e.g., sensor surface 212) on an ultrasonic sensor (e.g., ultrasonic sensor 200).

Moreover, the chart 500 includes a frequency axis 502 and an impedance axis 504. The frequency axis 502 is an X axis on the chart 500 representing units of frequency, and the impedance axis 504 is a Y axis representing units of impedance 504. The chart 500 also includes a line 510 that plots datapoints of frequency and impedance (e.g., frequency and impedance values) when an ultrasonic radiation surface (e.g., sensor surface 212) of an ultrasonic sensor (e.g., ultrasonic sensor 200) does not have frozen precipitation deposited on it, and a line 530 that plots datapoints of frequency and impedance when the ultrasonic radiation surface (e.g., sensor surface 212) of the ultrasonic sensor has frozen precipitation deposited on it.

In this example, the line 510 (e.g., corresponding to the scenario where the ultrasonic radiation surface of the ultrasonic sensor does not have frozen precipitation deposited on it) includes peaks 512, 514, 516, 518 (e.g., maximum values) having respective frequency and impedance values along the frequency axis 502 and the impedance axis 504, and troughs 520, 522, 524 (e.g., minimum values). Moreover, the line 530 (e.g., corresponding to the scenario where the ultrasonic radiation surface of the ultrasonic sensor has frozen precipitation deposited on it) includes a peak 532 (e.g., a maximum value) having respective frequency and impedance values along the frequency axis 502 and the impedance axis 504, and troughs 534, 536 (e.g., minimum values).

As shown, the peaks 512, 514, 516, 518 (e.g., maximum values) of the line 510 do not match the peak 532 associated with the line 530, and the troughs 520, 522, 524 (e.g., minimum values) of the line 510 do not match the troughs 534, 536 of the line 530. For example, the peak 532 (and associated frequency and impedance values) of the line 530 has shifted relative to the corresponding peak 512 (and associated frequency and impedance values) of the line 510, and the trough 534 (and associated frequency and impedance values) of the line 530 has shifted relative to the trough 522 (and associated frequency and impedance values) of the line 510. Such shift can be attributed to the frozen precipitation deposited on the ultrasound radiation surface of the ultrasonic sensor in the line 530 corresponding to the scenario where the ultrasonic radiation surface of the ultrasonic sensor has frozen precipitation deposited on it (e.g., in contrast to the ultrasonic radiation sensor of the ultrasonic sensor in the scenario plotted by line 510 where the ultrasonic radiation sensor does not have frozen precipitation deposited on it).

Thus, as illustrated in the chart 500, some of the impedance values along the line 530 have been shifted relative to the impedance values along the line 510 as a result of the frozen precipitation deposited on the ultrasonic radiation surface of the ultrasonic sensor in the scenario plotted by the line 530. The shift in the impedance values in the line 530 has also resulted in a shift in some of the frequency values of the line 530 relative to the frequency values of the line 510. As a result, the resonance frequencies of the ultrasonic sensor in the scenario where the ultrasonic radiation surface has frozen precipitation deposited on it have shifted relative to the resonance frequencies of the ultrasonic sensor in the scenario where the ultrasonic radiation surface does not have frozen precipitation deposited on it. Accordingly, to remove frozen precipitation from the ultrasonic radiation surface of the ultrasonic sensor as described herein, the ultrasonic sensor can be driven at a resonance frequency determined based on the frequency and impedance values plotted by line 530 in the chart 500.

Figure 6:
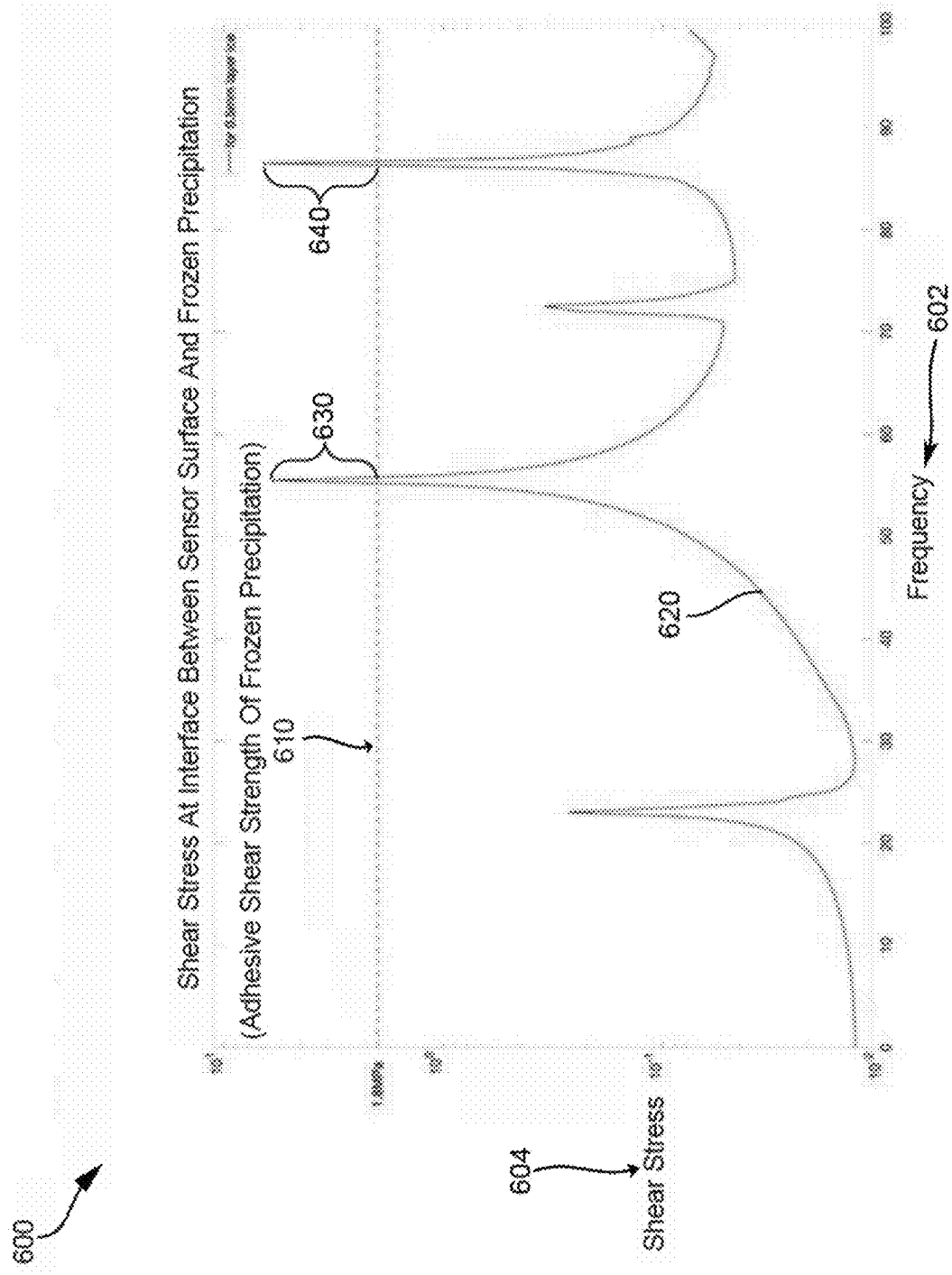
FIG. 6 is a chart illustrating example shear stress values at an interface between an ultrasonic radiation surface of an ultrasonic sensor and a layer(s) of frozen precipitation deposited on the ultrasonic radiation surface, according to some examples of the present disclosure.

FIG. 6 is a chart 600 illustrating example shear stress values at an interface between an ultrasonic radiation surface (e.g., sensor surface 212) of an ultrasonic sensor (e.g., ultrasonic sensor 200) and a layer(s) of frozen precipitation (e.g., layer(s) 302 of frozen precipitation) deposited on the ultrasonic radiation surface. The chart 600 includes a frequency axis 602 and a shear stress axis 604. The frequency axis 602 is an X axis on the chart 600 representing units of frequency, and the shear stress axis 604 is a Y axis representing units of shear stress 604. The chart 600 includes a line 620 that plots datapoints of frequency and shear stress (e.g., frequency and shear stress values) when an ultrasonic radiation surface (e.g., sensor surface 212) of an ultrasonic sensor (e.g., ultrasonic sensor 200) has frozen precipitation deposited on it. The chart 600 also includes a line 610 that plots the adhesive shear strength of the layer(s) of frozen precipitation on the ultrasonic radiation surface of the ultrasonic sensor.

As shown, the line 620 includes datapoints 630 and 640 that exceed the values along the line 610 representing the adhesive shear strength of the layer(s) of frozen precipitation on the ultrasonic radiation surface of the ultrasonic sensor. For example, the line 620 includes datapoints 630 that, at one or more respective frequencies as shown in FIG. 6, exceed the values along the line 610 representing the adhesive shear strength of the layer(s) of frozen precipitation on the ultrasonic radiation surface of the ultrasonic sensor, and datapoints 640 that, at one or more different respective frequencies as shown in FIG. 6, exceed the values along the line 610 representing the adhesive shear strength of the layer(s) of frozen precipitation on the ultrasonic radiation surface of the ultrasonic sensor.

To break/remove the layer(s) of frozen precipitation from the ultrasonic radiation surface of the ultrasonic sensor, the shear stress generated by the ultrasonic waves emitted by the ultrasonic sensor needs to exceed the adhesive shear strength of the layer(s) of frozen precipitation on the ultrasonic radiation surface of the ultrasonic sensor. Thus, as shown in FIG. 6, the ultrasonic sensor can automatically break/remove the layer(s) of frozen precipitation from the ultrasonic radiation surface of the ultrasonic sensor (e.g., without relying on a human to manually remove the layer(s) of frozen precipitation) by emitting ultrasonic waves at the frequencies corresponding to the datapoints 630 and/or the datapoints 640. Such frequencies can correspond to resonance frequencies shifted by the deposition of frozen precipitation on the ultrasonic radiation surface of the ultrasonic sensor as previously explained with respect to FIG. 5.

Figure 7:
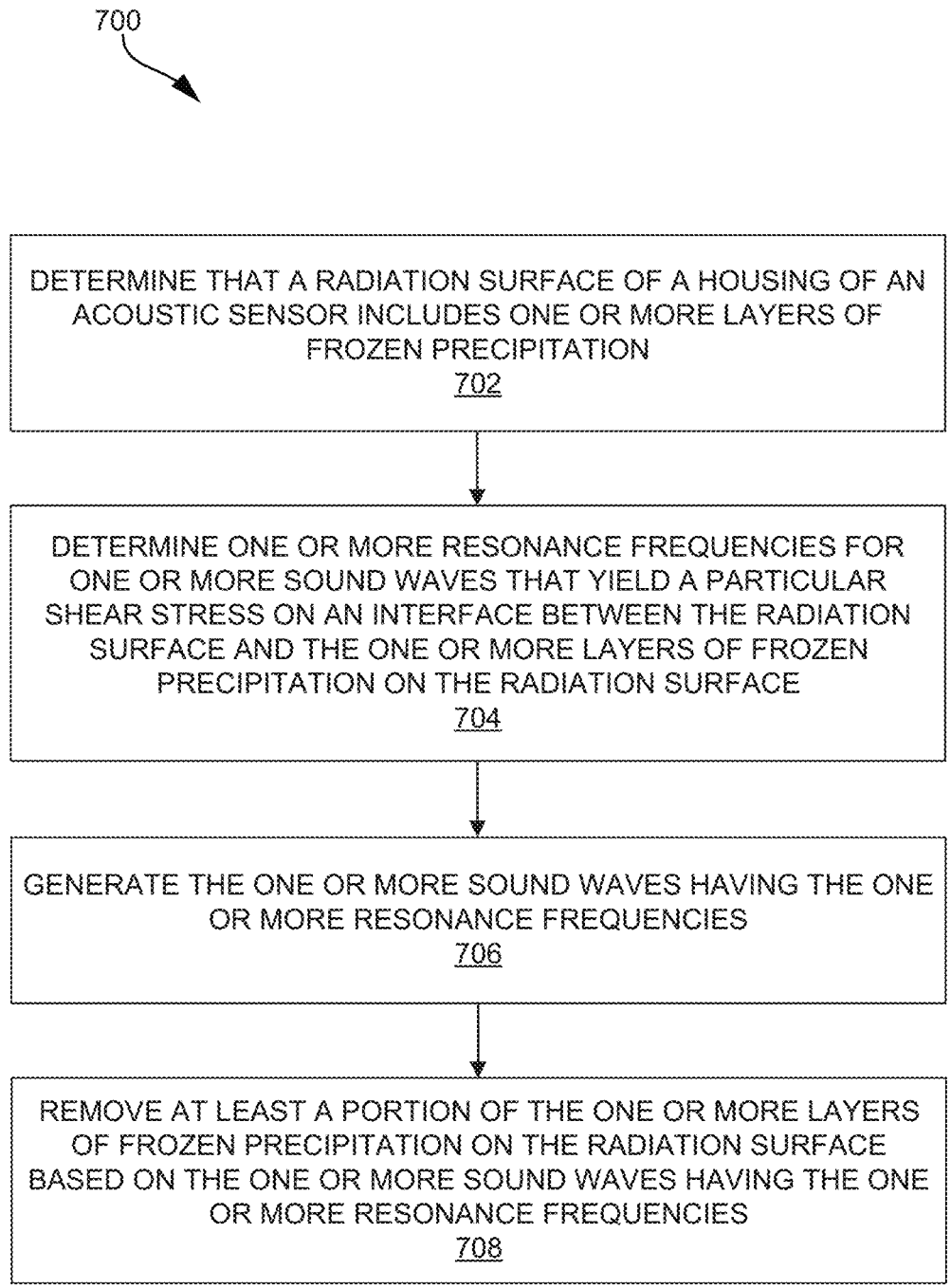
FIG. 7 is a flowchart illustrating an example process for deicing and/or defrosting an ultrasonic sensor using frequency tuning, according to some examples of the present disclosure.

FIG. 7 is a flowchart illustrating an example process 700 for deicing/defrosting an ultrasonic sensor using frequency tuning. At block 702, the process 700 can include determining that a radiation surface (e.g., sensor surface 212) of a housing (e.g., housing 210) of an acoustic sensor (e.g., ultrasonic sensor 200) includes one or more layers of frozen precipitation (e.g., layer(s) 302 of frozen precipitation. The housing can contain a transducer (e.g., ultrasonic transducer 202) configured to emit sound waves through the radiation surface of the housing and receive sound wave returns that are reflected from a target (e.g., an object, a vehicle, a pedestrian, an animal, a building, etc.) and pass through the radiation surface to the transducer.

The frozen precipitation can include, for example and without limitation, ice, frost, snow, and/or hail. The acoustic sensor can be or include an ultrasonic sensor. Moreover, the one or more sound waves can include one or more ultrasonic waves, and the transducer can be or include an active piezoelectric element.

In some examples, the one or more layers of frozen precipitation can be deposited on an external side of the radiation surface relative to the transducer contained within the housing of the acoustic sensor. In some cases, the radiation surface of the housing has an out-of-plane displacement when the acoustic sensor is provided an excitation signal with different amplitudes.

At block 704, the process 700 can include determining one or more resonance frequencies for one or more sound waves that yield (e.g., the one or more sound waves with the one or more resonance frequencies) a particular shear stress on an interface between the radiation surface and the one or more layers of frozen precipitation on the radiation surface. The particular shear stress includes a shear stress that exceeds an adhesive shear strength of the one or more layers of frozen precipitation. In some examples, the process 700 can include determining the adhesive shear strength of the one or more layers of the frozen precipitation on the radiation surface.

At block 706, the process 700 can include generating the one or more sound waves with the one or more resonance frequencies. For example, the transducer of the acoustic sensor can generate one or more sound waves configured to have the one or more resonance frequencies. In some examples, a processing device, such as a processor or controller, can send a signal to the acoustic sensor (e.g., to the transducer) to generate the one or more sound waves. The signal can be configured to trigger the transducer to generate the one or more sound waves according to (e.g., having/with) the one or more resonance frequencies. In some examples, the signal can include an excitation signal configured to trigger the transducer to generate vibrations that include the one or more sound waves with the one or more resonance frequencies.

At block 708, the process 700 can include removing at least a portion of the one or more layers of frozen precipitation on the radiation surface based on the one or more sound waves having the one or more resonance frequencies. In some examples, the transducer can be or include an ultrasonic transducer, and the ultrasonic transducer can be configured to emit, in response to an excitation signal, the one or more sound waves with the one or more resonance frequencies. The one or more sound waves can include the one or more ultrasonic waves.

In some aspects, the process 700 can include determining respective shear stress values of sound waves emitted at a plurality of frequencies; based on the respective shear stress values and the adhesive shear strength, determining one or more shear stress values of the respective shear stress values that exceed the adhesive shear strength; determining one or more frequencies corresponding to the one or more shear stress values; and determining that the one or more sound waves, when emitted at the one or more resonance frequencies corresponding to the one or more shear stress values, produce the shear stress that exceeds the adhesive shear strength. The one or more frequencies can include the one or more resonance frequencies.

In some aspects, the process 700 can include determining a change in an electromechanical impedance of the acoustic sensor in a presence of the one or more layers of frozen precipitation on the radiation surface; determining a resonance frequency shift caused by the change in the electromechanical impedance of the acoustic sensor in the presence of the one or more layers of frozen precipitation on the radiation surface; and determining the one or more resonance frequencies at least partly based on the resonance frequency shift.

Figure 8:
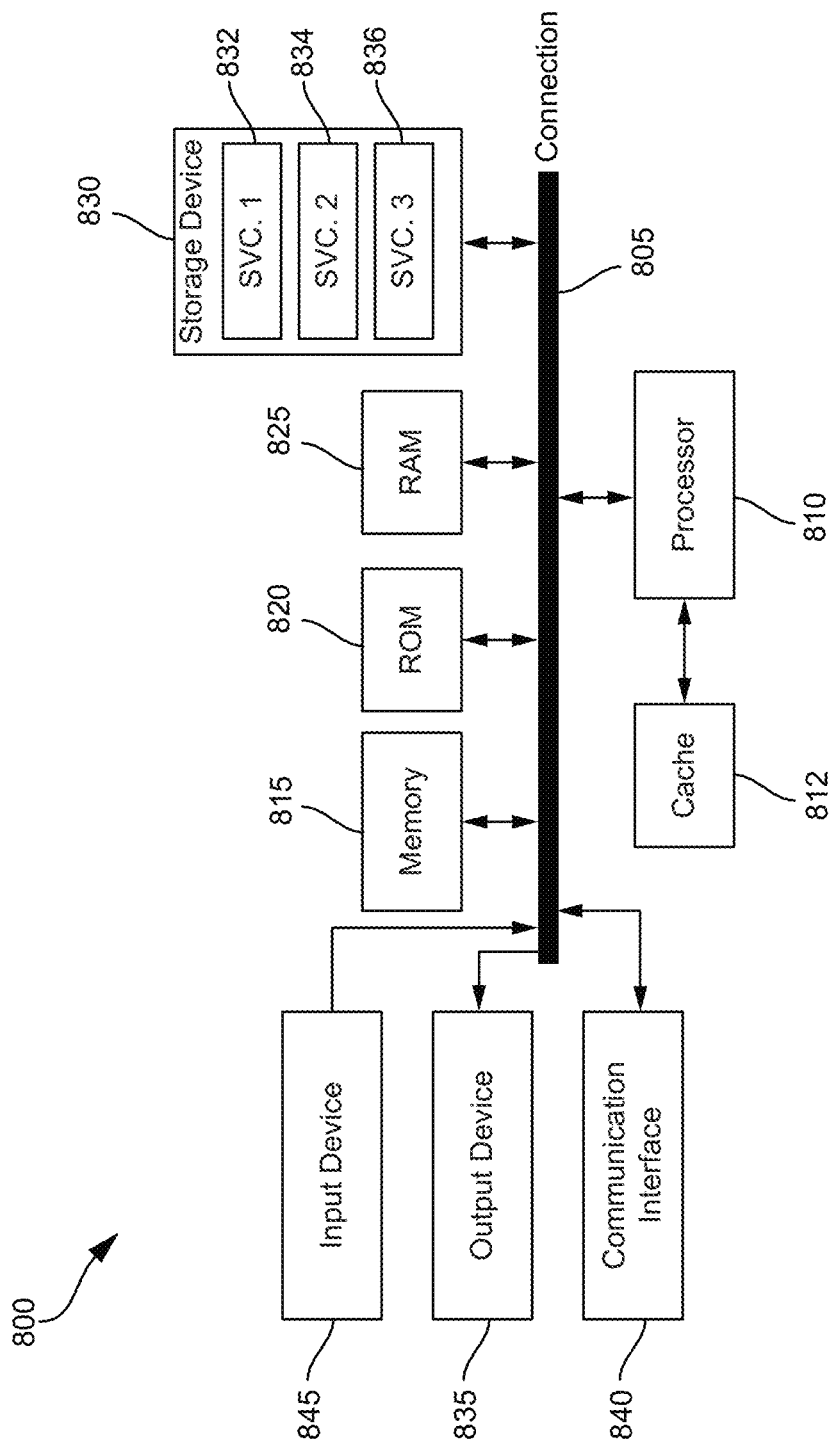
FIG. 8 illustrates an example processor-based system architecture for implementing certain aspects of the present disclosure.

FIG. 8 illustrates an example processor-based system with which some aspects of the subject technology can be implemented. For example, processor-based system 800 can be any computing device making up local computing device 110, one or more computers of data center 150, a passenger device (e.g., client computing device 170) executing the ridesharing application 172, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some examples, one or more of the described system components represents many such components each performing some or all of the function for which the component is described. In some aspects, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, and/or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 can include an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 830 can include software services, servers, services, etc., that when the code that defines such software is executed by the processor 810, causes the system to perform a function. In some examples, a hardware service that performs a particular function can include the software component stored in a computer-readable medium in connection with the necessary hardware components, such as processor 810, connection 805, output device 835, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: an acoustic sensor comprising a housing that contains a transducer, the transducer being configured to emit sound waves through a radiation surface of the housing and receive sound waves that are reflected from a target and pass through the radiation surface to the transducer; and a controller coupled to the acoustic sensor, wherein the controller is configured to: determine that the radiation surface includes one or more layers of frozen precipitation; and based on the radiation surface including one or more layers of frozen precipitation, send, to the acoustic sensor, a signal configured to trigger the transducer of the acoustic sensor to emit one or more sound waves having one or more resonance frequencies, wherein the one or more sound waves with the one or more resonance frequencies are determined to yield a shear stress on an interface between the radiation surface and the one or more layers of frozen precipitation that exceeds an adhesive shear strength of the one or more layers of frozen precipitation.

Aspect 2. The system of Aspect 1, wherein the controller is further configured to: determine respective shear stress values of sound waves emitted at a plurality of frequencies; based on the respective shear stress values and the adhesive shear strength, determine one or more shear stress values of the respective shear stress values that exceed the adhesive shear strength; determine one or more frequencies corresponding to the one or more shear stress values, the one or more frequencies comprising the one or more resonance frequencies; and determine that the one or more sound waves, when emitted at the one or more resonance frequencies corresponding to the one or more shear stress values, produce the shear stress that exceeds the adhesive shear strength.

Aspect 3. The system of any of Aspects 1 or 2, wherein the controller is further configured to: determine a change in an electromechanical impedance of the acoustic sensor in a presence of the one or more layers of frozen precipitation on the radiation surface; determine a resonance frequency shift caused by the change in the electromechanical impedance of the acoustic sensor in the presence of the one or more layers of frozen precipitation on the radiation surface; and determine the one or more resonance frequencies at least partly based on the resonance frequency shift.

Aspect 4. The system of any of Aspects 1 to 3, wherein the signal comprises an excitation signal having one or more amplitudes.

Aspect 5. The system of Aspect 4, wherein the one or more layers of frozen precipitation are deposited on an external side of the radiation surface relative to the transducer contained within the housing of the acoustic sensor, and wherein the radiation surface of the housing has an out-of-plane displacement when the acoustic sensor is provided the excitation signal with the one or more amplitudes.

Aspect 6. The system of any of Aspects 1 to 5, wherein the acoustic sensor comprises an ultrasonic sensor, wherein the one or more sound waves comprise one or more ultrasonic waves, and wherein the transducer comprises an active piezoelectric element.

Aspect 7. The system of any of Aspects 1 to 6, wherein the frozen precipitation comprises at least one of ice, frost, snow, and hail.

Aspect 8. The system of any of Aspects 1 to 7, wherein the transducer comprises an ultrasonic transducer, and wherein the ultrasonic transducer is configured to emit, in response to the signal, the one or more sound waves with the one or more resonance frequencies, the one or more sound waves comprising one or more ultrasonic waves.

Aspect 9. A method comprising: determining that a radiation surface of a housing of an acoustic sensor includes one or more layers of frozen precipitation, wherein the housing contains a transducer configured to emit sound waves through the radiation surface of the housing and receive sound waves that are reflected from a target and pass through the radiation surface to the transducer; determining one or more resonance frequencies for one or more sound waves that yield a particular shear stress on an interface between the radiation surface and the one or more layers of frozen precipitation on the radiation surface, wherein the particular shear stress exceeds an adhesive shear strength of the one or more layers of frozen precipitation; generating the one or more sound waves having the one or more resonance frequencies; and removing at least a portion of the one or more layers of frozen precipitation on the radiation surface based on the one or more sound waves having the one or more resonance frequencies.

Aspect 10. The method of Aspect 9, further comprising: determining respective shear stress values of sound waves emitted at a plurality of frequencies; based on the respective shear stress values and the adhesive shear strength, determining one or more shear stress values of the respective shear stress values that exceed the adhesive shear strength; determining one or more frequencies corresponding to the one or more shear stress values, the one or more frequencies comprising the one or more resonance frequencies; and determining that the one or more sound waves, when emitted at the one or more resonance frequencies corresponding to the one or more shear stress values, produce the shear stress that exceeds the adhesive shear strength.

Aspect 11. The method of any of Aspects 9 or 10, further comprising: determining a change in an electromechanical impedance of the acoustic sensor in a presence of the one or more layers of frozen precipitation on the radiation surface; determining a resonance frequency shift caused by the change in the electromechanical impedance of the acoustic sensor in the presence of the one or more layers of frozen precipitation on the radiation surface; and determining the one or more resonance frequencies at least partly based on the resonance frequency shift.

Aspect 12. The method of any of Aspects 9 to 11, further comprising: determining the adhesive shear strength of the one or more layers of the frozen precipitation on the radiation surface.

Aspect 13. The method of any of Aspects 9 to 12, wherein the one or more layers of frozen precipitation are deposited on an external side of the radiation surface relative to the transducer contained within the housing of the acoustic sensor, and wherein the radiation surface of the housing has an out-of-plane displacement when the acoustic sensor is provided an excitation signal with one or more amplitudes.

Aspect 14. The method of any of Aspects 9 to 13, wherein the acoustic sensor comprises an ultrasonic sensor, wherein the one or more sound waves comprise one or more ultrasonic waves, and wherein the transducer comprises an active piezoelectric element.

Aspect 15. The method of any of Aspects 9 to 14, wherein the frozen precipitation comprises at least one of ice, frost, snow, and hail.

Aspect 16. The method of any of Aspects 9 to 15, wherein the transducer comprises an ultrasonic transducer, and wherein the ultrasonic transducer is configured to emit, in response to an excitation signal, the one or more sound waves with the one or more resonance frequencies, the one or more sound waves comprising one or more ultrasonic waves.

Aspect 17. A non-transitory computer-readable medium having stored thereon instructions which, when executed by one or more processing devices, cause the one or more processing devices to perform a method according to any of Aspects 9 to 16.

Aspect 18. A system comprising means for performing a method according to any of Aspects 9 to 16.

Aspect 19. A computer-program product having stored thereon instructions which, when executed by one or more processors, cause the one or more processors to perform a method according to any of Aspects 9 to 16.

Aspect 20. An autonomous vehicle comprising an acoustic sensor comprising a housing that contains a transducer, the transducer being configured to emit sound waves through a radiation surface of the housing and receive sound waves that are reflected from a target and pass through the radiation surface to the transducer; and a controller coupled to the acoustic sensor, wherein the controller is configured to perform a method according to any of Aspects 9 to 16.

What is claimed is:

1. A system comprising:

an acoustic sensor comprising a housing that contains a transducer, the transducer being configured to emit sound waves through a radiation surface of the housing and receive sound waves that are reflected from a target and pass through the radiation surface to the transducer; and a controller coupled to the acoustic sensor;

wherein the controller is configured to:
send to the acoustic sensor a first type of control signal configured to trigger the transducer of the acoustic sensor to emit object detection sound waves configured to perform object detection operations of the acoustic sensor;
determine that the radiation surface includes one or more layers of frozen precipitation; and
based on the radiation surface including one or more layers of frozen precipitation, switch from the first type of control signal to send, to the acoustic sensor, a second type of control signal configured to trigger the transducer of the acoustic sensor to emit one or more deicing sound waves having one or more resonance frequencies, wherein the one or more deicing sound waves with the one or more resonance frequencies are determined to yield a shear stress on an interface between the radiation surface and the one or more layers of frozen precipitation that exceeds an adhesive shear strength of the one or more layers of frozen precipitation.

2. The system of claim 1, wherein the controller is further configured to:
determine respective shear stress values of sound waves emitted at a plurality of frequencies;
based on the respective shear stress values and the adhesive shear strength, determine one or more shear stress values of the respective shear stress values that exceed the adhesive shear strength;
determine one or more frequencies corresponding to the one or more shear stress values, the one or more frequencies comprising the one or more resonance frequencies; and
determine that the one or more deicing sound waves, when emitted at the one or more resonance frequencies corresponding to the one or more shear stress values, produce the shear stress that exceeds the adhesive shear strength.

3. The system of claim 1, wherein the controller is further configured to:
determine a change in an electromechanical impedance of the acoustic sensor in a presence of the one or more layers of frozen precipitation on the radiation surface;
determine a resonance frequency shift caused by the change in the electromechanical impedance of the acoustic sensor in the presence of the one or more layers of frozen precipitation on the radiation surface; and
determine the one or more resonance frequencies at least partly based on the resonance frequency shift.

4. The system of claim 1, wherein the second type of control signal comprises an excitation signal having one or more amplitudes.

5. The system of claim 4, wherein the one or more layers of frozen precipitation are deposited on an external side of the radiation surface relative to the transducer contained within the housing of the acoustic sensor, and wherein the radiation surface of the housing has an out-of-plane displacement when the acoustic sensor is provided the excitation signal with the one or more amplitudes.

6. The system of claim 1, wherein the acoustic sensor comprises an ultrasonic sensor, wherein the one or more deicing sound waves comprise one or more ultrasonic waves, and wherein the transducer comprises an active piezoelectric element.

7. The system of claim 1, wherein the frozen precipitation comprises at least one of ice, frost, snow, and hail.

8. The system of claim 1, wherein the transducer comprises an ultrasonic transducer, and wherein the ultrasonic transducer is configured to emit, in response to the second type of control signal, the second type of the sound waves with the one or more resonance frequencies, the one or more sound waves comprising one or more ultrasonic waves.

9. A method comprising:
determining that a radiation surface of a housing of an acoustic sensor includes one or more layers of frozen precipitation, wherein the housing contains a transducer configured to emit sound waves through the radiation surface of the housing and receive sound waves that are reflected from a target and pass through the radiation surface to the transducer;
determining one or more resonance frequencies for one or more sound waves that yield a particular shear stress on an interface between the radiation surface and the one or more layers of frozen precipitation on the radiation surface, wherein the particular shear stress exceeds an adhesive shear strength of the one or more layers of frozen precipitation;
responsive to determining that the radiation surface of the housing of the acoustic sensor includes the one or more layers of frozen precipitation, switching control of the acoustic sensor from a first type of control signal to a second type of control signal, the first type of control signal configured to trigger the transducer of the acoustic sensor to emit object detection sound waves configured to perform object detection operations of the acoustic sensor, the second type of control signal triggering the transducer of the acoustic sensor to generate one or more deicing sound waves having the one or more resonance frequencies; and
removing at least a portion of the one or more layers of frozen precipitation on the radiation surface based on the one or more deicing sound waves having the one or more resonance frequencies.

10. The method of claim 9, further comprising:
determining respective shear stress values of sound waves emitted at a plurality of frequencies;
based on the respective shear stress values and the adhesive shear strength, determining one or more shear stress values of the respective shear stress values that exceed the adhesive shear strength;
determining one or more frequencies corresponding to the one or more shear stress values, the one or more frequencies comprising the one or more resonance frequencies; and
determining that the one or more deicing sound waves, when emitted at the one or more resonance frequencies corresponding to the one or more shear stress values, produce the shear stress that exceeds the adhesive shear strength.

11. The method of claim 9, further comprising:
determining a change in an electromechanical impedance of the acoustic sensor in a presence of the one or more layers of frozen precipitation on the radiation surface;
determining a resonance frequency shift caused by the change in the electromechanical impedance of the acoustic sensor in the presence of the one or more layers of frozen precipitation on the radiation surface; and
determining the one or more resonance frequencies at least partly based on the resonance frequency shift.

12. The method of claim 9, further comprising: determining the adhesive shear strength of the one or more layers of the frozen precipitation on the radiation surface.

13. The method of claim 9, wherein the one or more layers of frozen precipitation are deposited on an external side of the radiation surface relative to the transducer contained within the housing of the acoustic sensor, and wherein the radiation surface of the housing has an out-of-plane displacement when the acoustic sensor is provided the second control signal comprising an excitation signal with one or more amplitudes.

14. The method of claim 9, wherein the acoustic sensor comprises an ultrasonic sensor, wherein the one or more deicing sound waves comprise one or more ultrasonic waves, and wherein the transducer comprises an active piezoelectric element.

15. The method of claim 9, wherein the frozen precipitation comprises at least one of ice, frost, snow, and hail.

16. The method of claim 9, wherein the transducer comprises an ultrasonic transducer, and wherein the ultrasonic transducer is configured to emit, in response to the second type of control signal comprising an excitation signal, the one or more deicing sound waves with the one or more resonance frequencies, the one or more deicing sound waves comprising one or more ultrasonic waves.

17. A non-transitory computer-readable medium having stored thereon instructions which, when executed by one or more processing devices, cause the one or more processing devices to:
   determine that a radiation surface of a housing of an acoustic sensor includes one or more layers of frozen precipitation, wherein the housing contains a transducer configured to emit sound waves through the radiation surface of the housing and receive sound waves that are reflected from a target and pass through the radiation surface to the transducer;
   determine one or more resonance frequencies for one or more sound waves that yield a particular shear stress on an interface between the radiation surface and one or more layers of frozen precipitation on the radiation surface, wherein the particular shear stress exceeds an adhesive shear strength of the one or more layers of frozen precipitation; and
   based on a determination that there are one or more layers of frozen precipitation on the radiation surface, switch control of the acoustic sensor from a first type of control signal to a second type of control signal, the first type of control signal configured to trigger the transducer of the acoustic sensor to emit object detection sound waves configured to perform object detection operations of the acoustic sensor, the second type of control signal configured to trigger the transducer of the acoustic sensor to emit the one or more deicing sound waves having the one or more resonance frequencies, wherein the one or more deicing sound waves having the one or more resonance frequencies are configured to remove at least a portion of the layer of frozen precipitation on the radiation surface based on the shield stress exceeding the adhesive shear strength.

18. The non-transitory computer-readable medium of claim 17, further comprising instructions which, when executed by one or more processing devices, cause the one or more processing devices to:
   determine respective shear stress values of sound waves emitted at a plurality of frequencies;
   based on the respective shear stress values and the adhesive shear strength, determine one or more shear stress values of the respective shear stress values that exceed the adhesive shear strength;
   determine one or more frequencies corresponding to the one or more shear stress values, the one or more frequencies comprising the one or more resonance frequencies; and
   determine that the one or more deicing sound waves, when emitted at the one or more resonance frequencies corresponding to the one or more shear stress values, produce the shear stress that exceeds the adhesive shear strength.

19. The non-transitory computer-readable medium of claim 17, further comprising instructions which, when executed by one or more processing devices, cause the one or more processing devices to:
   determine a change in an electromechanical impedance of the acoustic sensor in a presence of the one or more layers of frozen precipitation on the radiation surface;
   determine a resonance frequency shift caused by the change in the electromechanical impedance of the acoustic sensor in the presence of the one or more layers of frozen precipitation on the radiation surface; and
   determine the one or more resonance frequencies at least partly based on the resonance frequency shift.

20. The non-transitory computer-readable medium of claim 17, wherein the second type of control signal comprises an excitation signal having one or more amplitudes, wherein the one or more layers of frozen precipitation are deposited on an external side of the radiation surface relative to the transducer contained within the housing of the acoustic sensor, and wherein the radiation surface of the housing has an out-of-plane displacement when the acoustic sensor is provided with the second type of control signal, the excitation signal having one or more amplitudes.

* * * * *